US012716575B2

(12) United States Patent
Wilz

(10) Patent No.: US 12,716,575 B2
(45) Date of Patent: *Aug. 25, 2026

(54) WIRELESS CONTROLLABLE LIGHTING DEVICE

(71) Applicant: Lutron Technology Company LLC, Coopersburg, PA (US)

(72) Inventor: Aaron J. Wilz, Emmaus, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/198,878

(22) Filed: May 5, 2025

(65) Prior Publication Data

US 2025/0264210 A1 Aug. 21, 2025

Related U.S. Application Data

(63) Continuation of application No. 18/742,561, filed on Jun. 13, 2024, now Pat. No. 12,313,244, which is a continuation of application No. 18/214,789, filed on Jun. 27, 2023, now Pat. No. 12,055,285, which is a (Continued)

(51) Int. Cl.

| | |
|---|---|
| ***F21V 17/16*** | (2006.01) |
| ***F21V 13/04*** | (2006.01) |
| ***H05B 47/19*** | (2020.01) |
| *F21K 9/237* | (2016.01) |

(Continued)

(52) U.S. Cl.

CPC ............ *F21V 17/164* (2013.01); *F21V 13/04* (2013.01); *H05B 47/19* (2020.01); *F21K 9/237* (2016.08); *F21Y 2105/10* (2016.08); *F21Y 2115/10* (2016.08)

(58) Field of Classification Search

CPC ...... F21K 9/237; F21V 17/164; F21V 17/168; F21V 13/04

See application file for complete search history.

(56) References Cited

U.S. PATENT DOCUMENTS 5,032,958 A * 7/1991 Harwood ................ F21V 7/005 362/217.08
6,382,818 B1 * 5/2002 Iwama .................. F21S 41/295 362/520
10,151,457 B2 * 12/2018 Liu ....................... F21V 17/164
(Continued)

FOREIGN PATENT DOCUMENTS

CN 103492791 A 1/2014
CN 104094046 A 10/2014
(Continued)

*Primary Examiner* — James R Greece
*Assistant Examiner* — Michael Chiang
(74) *Attorney, Agent, or Firm* — Flaster Greenberg P.C.

(57) ABSTRACT

A lighting device may include a lens, an emitter configured to emit light through the lens, and a reflector. The reflector may define a cavity that extends from a first end to a second end of the reflector. The emitter may be received in the first end of the reflector, and the lens may be attached to the second end of the reflector. The lens may include teeth that extend from a rear surface of a rim of the lens. The reflector may include a collar at the second end, and the collar may include attachment clips that are configured to lock the teeth in place and retain the lens in attachment to the reflector.

16 Claims, 6 Drawing Sheets

Related U.S. Application Data continuation of application No. 17/647,920, filed on Jan. 13, 2022, now Pat. No. 11,713,867.

(60) Provisional application No. 63/136,958, filed on Jan. 13, 2021.

(51) Int. Cl.
*F21Y 105/10* (2016.01)
*F21Y 115/10* (2016.01)

(56) References Cited

U.S. PATENT DOCUMENTS

| | | | | |
|---|---|---|---|---|
| 10,928,041 | B2 * | 2/2021 | Zou | F21V 17/18 |
| 11,713,867 | B2 * | 8/2023 | Wilz | F21V 7/00<br>362/249.02 |
| 12,055,285 | B2 * | 8/2024 | Wilz | F21V 3/00 |
| 12,313,244 | B2 * | 5/2025 | Wilz | F21V 3/00 |
| 2007/0058374 | A1 * | 3/2007 | Dupre | F21V 17/16<br>362/341 |
| 2012/0106176 | A1 | 5/2012 | Lopez et al. | |
| 2015/0009679 | A1 * | 1/2015 | Seki | F21V 13/04<br>362/307 |
| 2018/0238521 | A1 | 8/2018 | Uhler | |
| 2019/0242552 | A1 * | 8/2019 | Liu | F21V 5/02 |
| 2021/0080085 | A1 * | 3/2021 | Hu | F21V 17/164 |

FOREIGN PATENT DOCUMENTS

| | | |
|---|---|---|
| CN | 104100907 A | 10/2014 |
| CN | 108700280 A | 10/2018 |

* cited by examiner

WIRELESS CONTROLLABLE LIGHTING DEVICE

CROSS-REFERENCE TO RELATED APPLICATIONS

This application is a continuation of U.S. patent application Ser. No. 18/742,561, filed Jun. 13, 2024, which is a continuation of U.S. patent application Ser. No. 18/214,789, filed Jun. 27, 2023, which is a continuation of U.S. patent application Ser. No. 17/647,920, filed Jan. 13, 2022, which claims the benefit of Provisional U.S. Patent Application No. 63/136,958, filed Jan. 13, 2021, the disclosures of which are incorporated herein by reference in their entirety.

BACKGROUND

Lamps and displays using efficient light sources, such as light-emitting diodes (LED) light sources, for illumination are becoming increasingly popular in many different markets. LED light sources provide a number of advantages over traditional light sources, such as incandescent and fluorescent lamps. For example, LED light sources may have a lower power consumption and a longer lifetime than traditional light sources. In addition, the LED light sources may have no hazardous materials, and may provide additional specific advantages for different applications. When used for general illumination, LED light sources provide the opportunity to adjust the color (e.g., from white, to blue, to green, etc.) or the color temperature (e.g., from warm white to cool white) of the light emitted from the LED light sources to produce different lighting effects.

A multi-colored LED illumination device may have two or more different colors of LED emission devices (e.g., LED emitters) that are combined within the same package to produce light (e.g., white or near-white light). There are many different types of white light LED light sources on the market, some of which combine red, green, and blue (RGB) LED emitters; red, green, blue, and yellow (RGBY) LED emitters; phosphor-converted white and red (WR) LED emitters; red, green, blue, and white (RGBW) LED emitters, etc. By combining different colors of LED emitters within the same package, and driving the differently-colored emitters with different drive currents, these multi-colored LED illumination devices may generate white or near-white light within a wide gamut of color points or correlated color temperatures (CCTs) ranging from warm white (e.g., approximately 2600K-3700K), to neutral white (e.g., approximately 3700K-5000K) to cool white (e.g., approximately 5000K-8300K). Some multi-colored LED illumination devices also may enable the brightness (e.g., intensity or dimming level) and/or color of the illumination to be changed to a particular set point. These tunable illumination devices may all produce the same color and color rendering index (CRI) when set to a particular dimming level and chromaticity setting (e.g., color set point) on a standardized chromaticity diagram.

SUMMARY

As described herein, a lighting device may comprise a lens having teeth extending from a rear surface of a rim of the lens and a reflector having a collar with attachment clips configured to lock the teeth in place and retain the lens in attachment to the reflector. The reflector may define cavity that extends from a first end to a second end of the reflector. The collar may be located at the second end of the reflector, such that the lens is attached to the second end of the lens. The lighting device may also comprise an emitter that is received in the first end and is configured to emit light through the lens. The attachment clips of the collar of the reflector may each comprise a clip arm that are attached to the collar at a first end and extend to a second end. The clip arm of each attachment clip may define a slot between the respective clip arm and the collar and may flex about the first end. The collar may comprise recesses between the second ends of each clip arm and respective radial surfaces of the collar. The teeth may be configured to be received in the recesses of the collar when the lens is attached to the reflector. To attach the lens to the reflector, the teeth may be inserted into the slots of the attachment clips and the lens may be rotated such the teeth are moved into the recesses of the collar.

In addition, the teeth of the lens may each comprise a ledge portion configured to contact a respective lip portion of the collar of the reflector to retain the lens in attachment to the reflector. The reflector may further comprise spring arms configured to apply force onto the lens to cause the ledge portions of the teeth of the lens to come in contact with the respective lip portions of the collar of the reflector when the lens is attached to the reflector. The application of force by the spring arms against the lens to bias the ledge portions against the lip portions may prevent the lens from rattling against the reflector and making noise when the lens is attached to the reflector.

A lighting device may include a lens, an emitter configured to emit light through the lens, and a reflector. The reflector may define a cavity that extends from a first end to a second end of the reflector. The emitter may be received in the first end of the reflector, and the lens may be attached to the second end of the reflector. The lens may include teeth that extend from a rear surface of a rim of the lens. In some examples, the teeth may be arc-shaped. The reflector may include a collar at the second end, and the collar may include attachment clips that are configured to lock the teeth in place and retain the lens in attachment to the reflector. The attachment clips may each comprise a clip arm that are attached to the collar at a first end and extend to a second end. The clip arm of each attachment clip may define a slot between the respective clip arm and the collar. The clip arm of each attachment clip may be configured to flex about the first end. In such examples, the collar may include recesses between the second ends of each clip arm and respective radial surfaces of the collar, and the teeth may be configured to be received in the recesses of the collar when the lens is attached to the reflector. Further, in some instance, in order to attach the lens to the reflector, the teeth may be inserted into the slots of the attachment clips and the lens may be rotated such the teeth are moved into the recesses of the collar.

The teeth of the lens may each include a ledge portion that is configured to contact a respective lip portion of the collar of the reflector to retain the lens in attachment to the reflector. The reflector may include spring arms that are configured to apply force onto the lens to cause the ledge portions of the teeth of the lens to come in contact with the respective lip portions of the collar of the reflector when the lens is attached to the reflector. Further, in some examples, the teeth may each include a body portion that is connected to the rear surface of the rim portion via two legs. The teeth may be configured so that there is a cavity located between the body portion and the rear surface of the rim portion. The body portion of the teeth may include a ledge portion that extends in a radial direction from an interior surface of the body portion toward a center of the rim portion. The ledge portion of the teeth may be configured to contact a rear surface the respective lip portion to secure the lip portion within a cavity that is located between the body portion and the rear surface of the rim portion.

DETAILED DESCRIPTION

Figure 1:
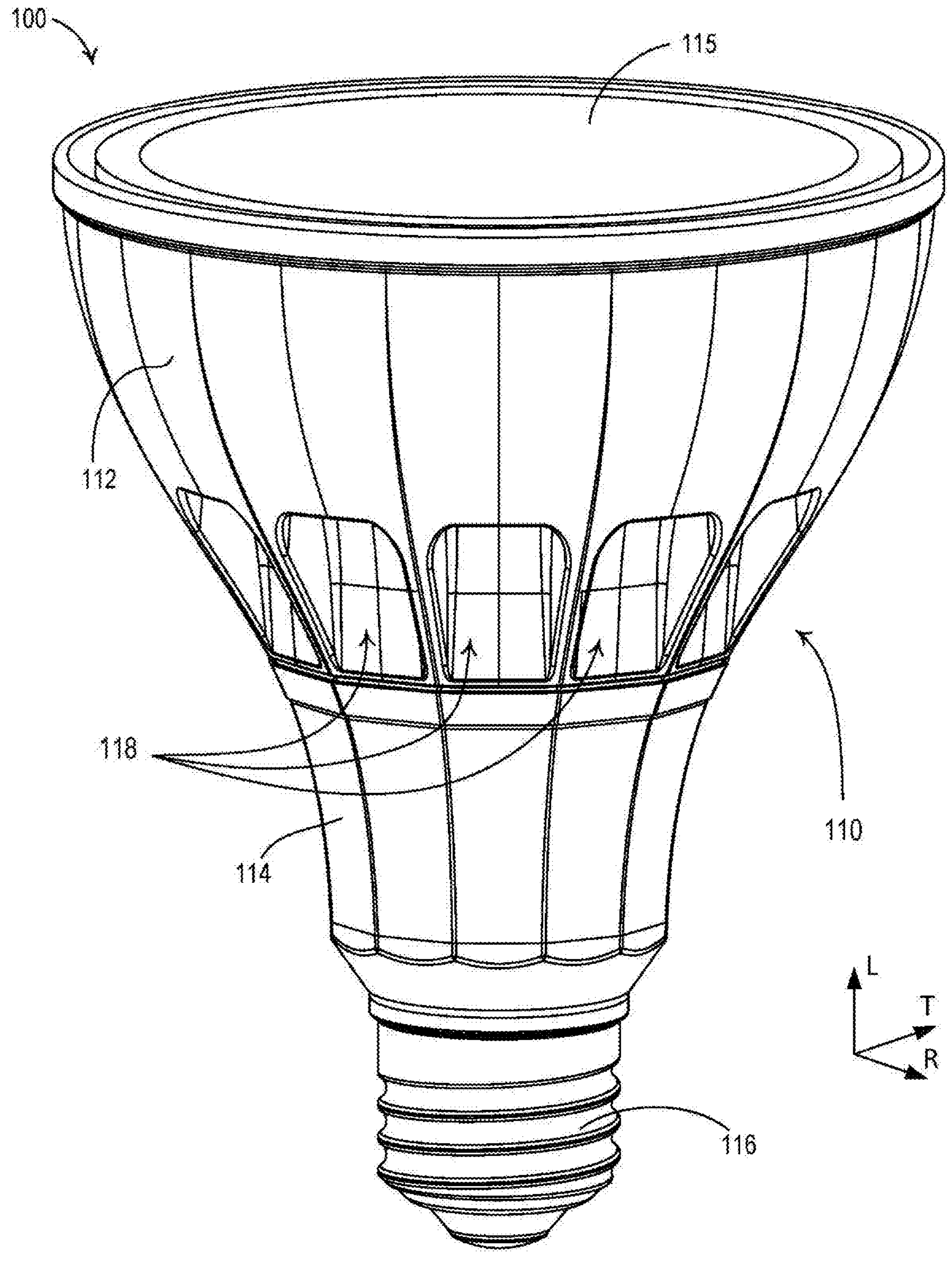
FIG. 1 is a perspective view of an example lighting device.

FIG. 1 is a perspective view of an example illumination device, such as a lighting device 100 (e.g., a controllable LED lighting device). The lighting device 100 may have a parabolic form factor and may be a parabolic aluminized reflector (PAR) lamp. The lighting device 100 may include a housing 110 (e.g., having a housing heat sink 112 and a base portion 114) and a lens 115. The lens 115 may be made of any suitable material, for example glass. The lens 115 may be transparent or translucent and may be flat or domed, for example. The lighting device 100 may include a screw-in base 116 that may be configured to be screwed into a standard Edison socket for electrically coupling the lighting device 100 to an alternating-current (AC) power source. The housing heat sink 112 may comprise vents 118 to allow for cooling of the lighting device 100 (e.g., as will be described in greater detail below).

Figure 2:
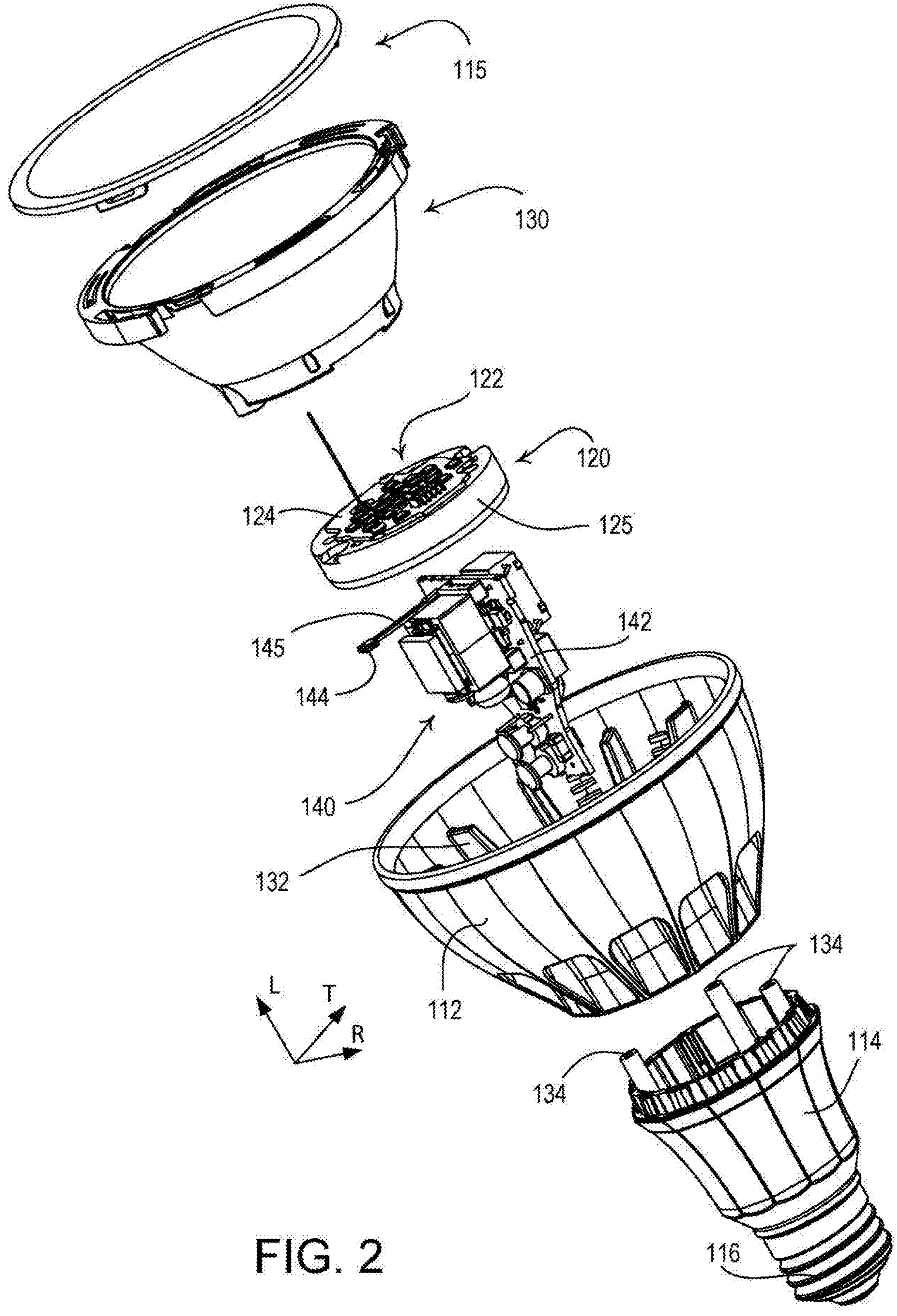
FIG. 2 is an exploded view of the lighting device of FIG. 1.

FIG. 2 is an exploded view of the lighting device 100. The lighting device 100 may comprise a light-generation module 120 that has one or more light sources, such as emitters 122 (e.g., emission LEDs) mounted to an emitter printed circuit board (PCB) 124. The emitters 122 of the light-generation module 120 may be configured to shine light through the lens 115. The light-generation module 120 may comprise a module heat sink 125 to which the emitters 122 of the emitter PCB 124 may be thermally coupled. The module heat sink 125 may be made from a thermally-conductive material (e.g., aluminum). The module heat sink 125 may have a circular periphery. The module heat sink 125 may have cylindrical shape and/or a truncated cone shape. The light-generation module 120 may be mounted (e.g., press fit) within the housing heat sink 112. The module heat sink 125 of the light-generation module 120 may be thermally coupled to the housing heat sink 112. The module heat sink 125 may transfer heat to the housing heat sink 112 peripherally. The housing heat sink 112 may be made from a material that is cheaper, but less thermally conductive than the material of the module heat sink 125. The housing heat sink 112 may be larger in volume and may have more surface area than the module heat sink 125.

The lighting device 100 may comprise a reflector 130 that may be located within the housing heat sink 112 of the housing 110. The reflector 130 may be configured to reflect the light emitted by the emitters 122 of the emitter circuit 124 towards the lens 115. The reflector 130 may shape the light produced by the emission LEDs within the emitter module 122 to shine out through the lens 115. The reflector 130 may be configured to sit on fins 132 inside of the housing heat sink 112 of the housing 110. The lens 115 may be connected to the reflector 130 (e.g., as will be described in greater detail below).

The lighting device 100 may further comprise a power converter circuit 140 mounted to a power printed circuit board (PCB) 142. The power converter circuit 140 may be enclosed by the inner sleeve 114 of the lighting device 100. The power converter circuit 140 may be electrically connected to the screw-in base 118, such that the power converter circuit may be configured to receive an AC mains line voltage generated by the AC power source. The power converter circuit 140 may comprise a bus connector 144 that may be electrically connected to the power PCB 142 via electrical wires 145 and may provide for electrically connection to the light-generation module 120. The power converter circuit 140 may be configured to convert the AC mains line voltage received from the AC power source into a direct-current (DC) bus voltage for powering the light-generation module 120. The power converter circuit 140 may comprise a rectifier circuit (e.g., a full-wave bridge rectifier) for converting the AC mains line voltage to a rectified voltage. The power PCB 140 may be arranged in a plane that is parallel to a plane of the emitter PCB 124 of the light-generation module 120.

Figure 3:
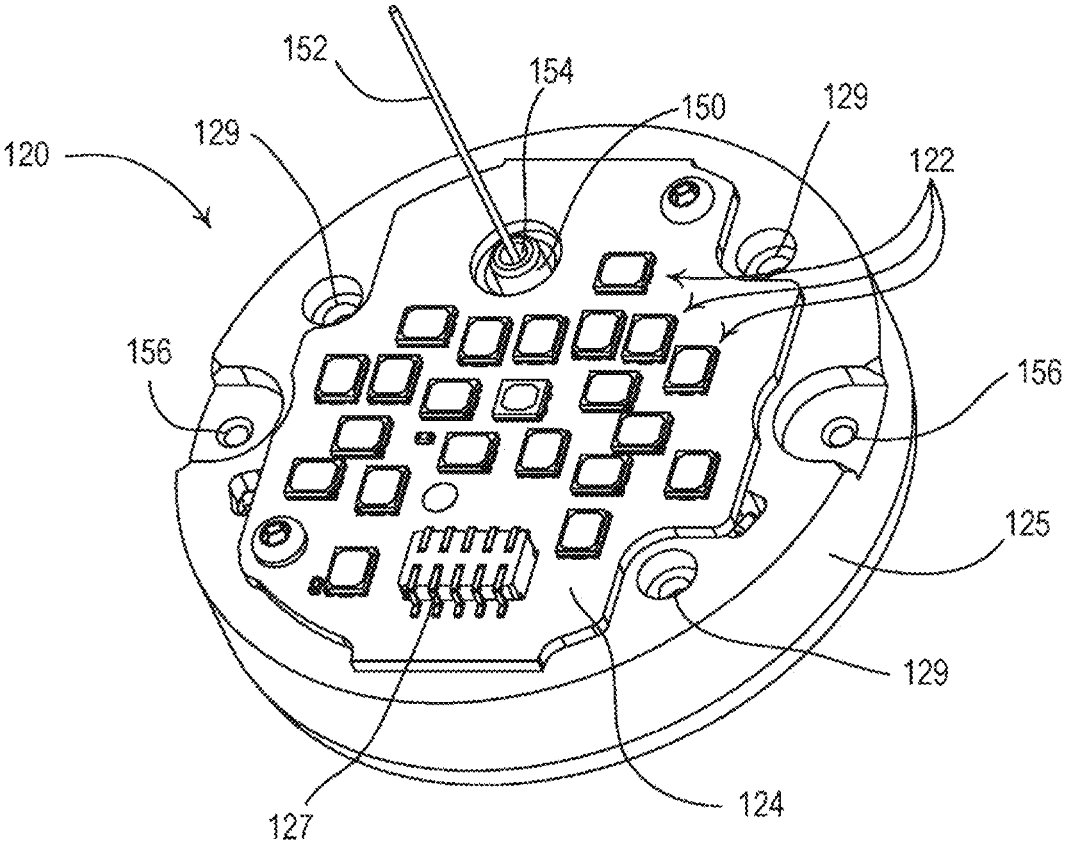
FIG. 3 is a top view of a light-generation module of the lighting device of FIG. 1.
Figure 4:
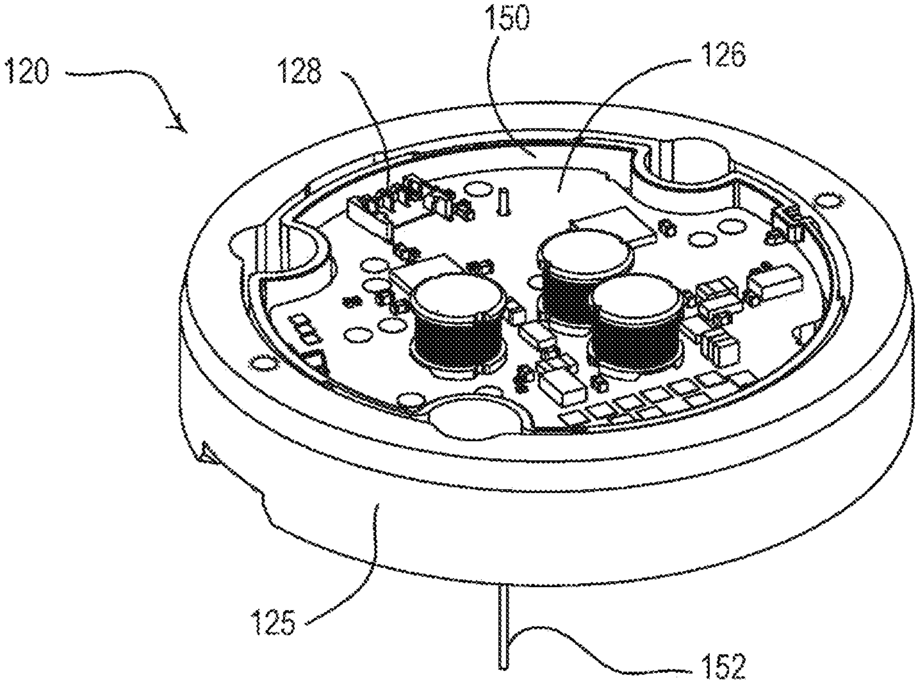
FIG. 4 is a bottom view of the light-generation module of FIG. 4.

FIG. 3 is a top view and FIG. 4 is a bottom view of the light-generation module 120. The emitters 122 may be arranged on (e.g., mounted to) the emitter PCB 124. The light-generation module 120 may also comprise a control PCB 126 on which electrical circuitry may be mounted. The module heat sink 125 of the light-generation module 120 may be captured (e.g., sandwiched) between the emitter PCB 124 and the control PCB 126. The emitter PCB 124 and the control PCB 126 may each have a circularly-shaped periphery. The control PCB 126 may be electrically isolated from the module heat sink 125 via an insulator 150. The control PCB 126 may be electrically connected to the emitter PCB 124 through pins (not shown) that are electrically connected to the control PCB 126 and extend through the module heat sink 125 to a connector 127 on the emitter PCB 124. The pins may be electrically isolated from the module heat sink 125 (e.g., via the insulator 150). The electrical circuitry mounted on the control PCB 126 may include one or more drive circuits for controlling the amount of power delivered to the emitters 122 of the emitter PCB 124, one or more control circuits for controlling the drive circuits, and one or more wireless communication circuits for communicating wireless signal (e.g., radio-frequency (RF) signals) with external devices. The control PCB 126 may comprise a bus connector 128 configured to be attached to the bus connector 144 of the power converter circuit 140 on the power PCB 142. The control PCB 126 may be arranged in a plane that is parallel to a plane of the emitter PCB 124. The light-generation module 120 may be attached to the inner sleeve 114 via fasteners (e.g., screws-not shown) that extend through openings 129 in the module heat sink 125 and are received in openings 134 in the inner sleeve 114.

The light-generation module 120 may comprise an antenna 152 electrically connected to at least one of the wireless communication circuits mounted to the control PCB 126. For example, the antenna 152 may comprise a plated wire. The antenna 152 may be electrically isolated from a control circuit on the control PCB 126. The antenna 152 may be configured to extend from the control PCB 126 through the module heat sink 125, for example, through a bore 154 in the insulator 150 (e.g., to isolate the antenna 152 from the module heat sink 125). The light-generation module 120 may be attached to the reflector 130 via fasteners (e.g., screws-not shown) that extend through openings 156 in the module heat sink 125 and openings 136 (FIGS. 8A and 8B) in the reflector 130. The antenna 152 may extend into an optical cavity of the lighting device 100 (e.g., cavity 172 shown in FIG. 5). The antenna 152 may be capacitively coupled to and electrically isolated from the wireless communication circuit, for example, as described in commonly-assigned U.S. Pat. No. 9,155,172, issued Oct. 6, 2015, entitled LOAD CONTROL DEVICE HAVING AN ELECTRICALLY ISOLATED ANTENNA, the entire disclosure of which is hereby incorporated by reference.

Figure 5:
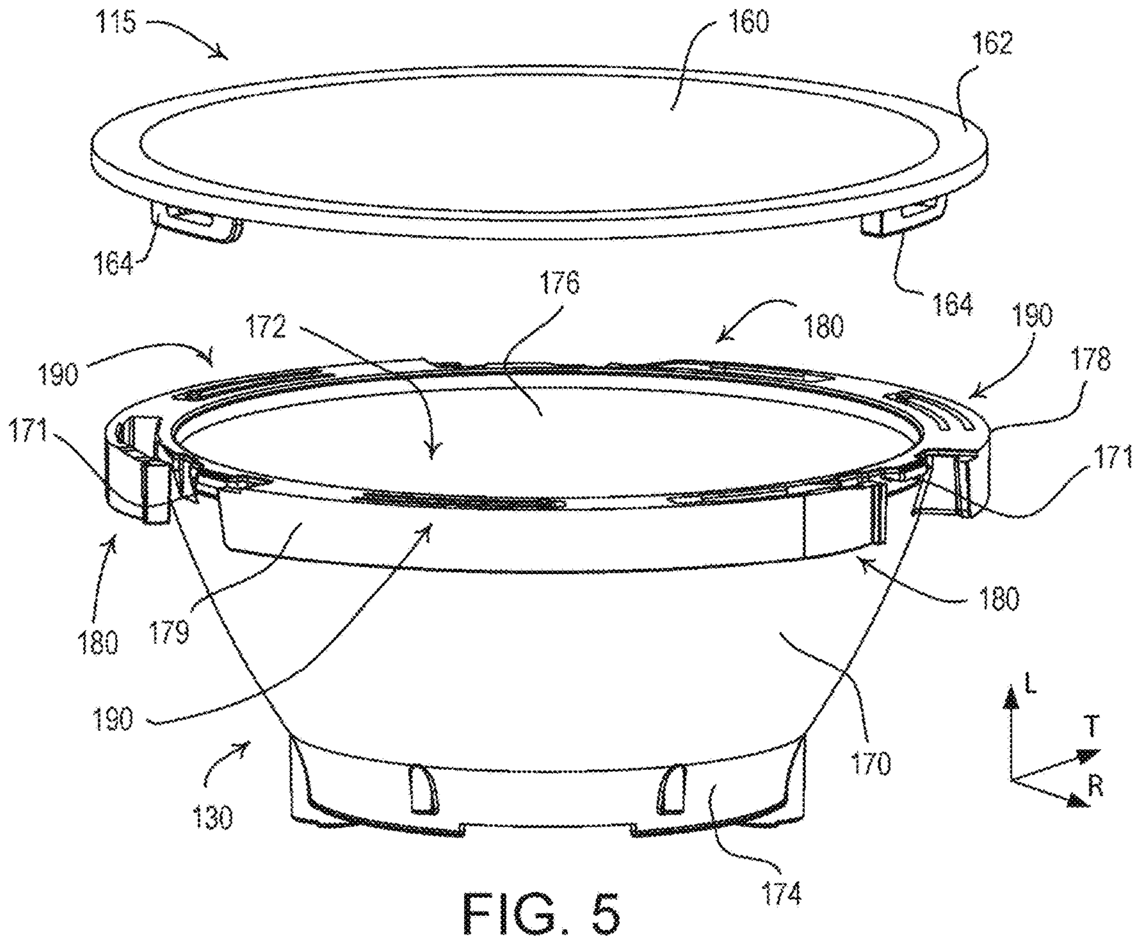
FIG. 5 is a top perspective view of a lens and a reflector of the lighting device of FIG. 1.
Figure 6:
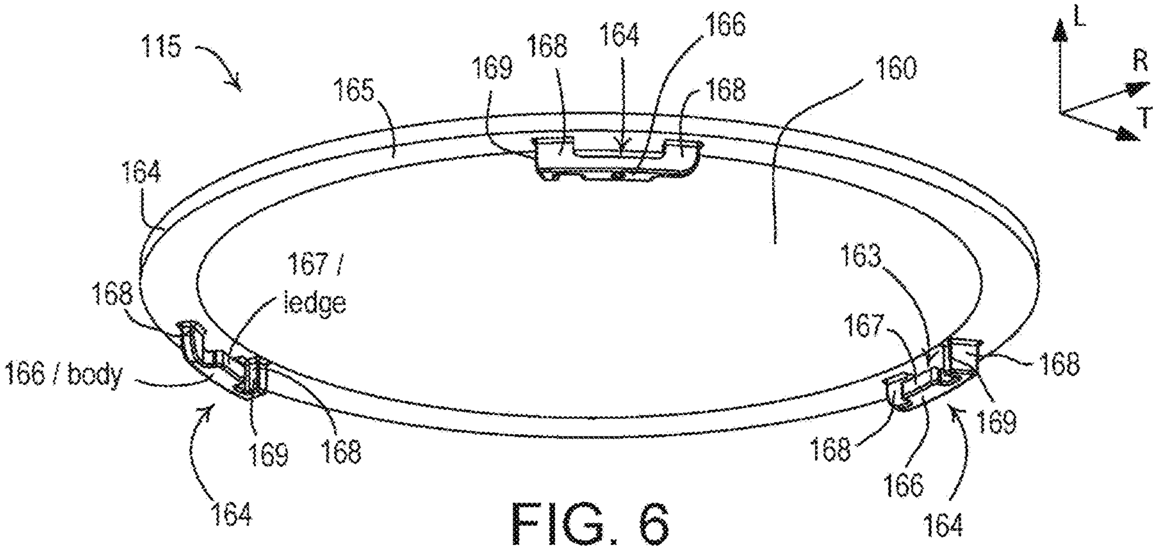
FIG. 6 is a bottom perspective view of the lens of FIG. 5.
Figure 7:
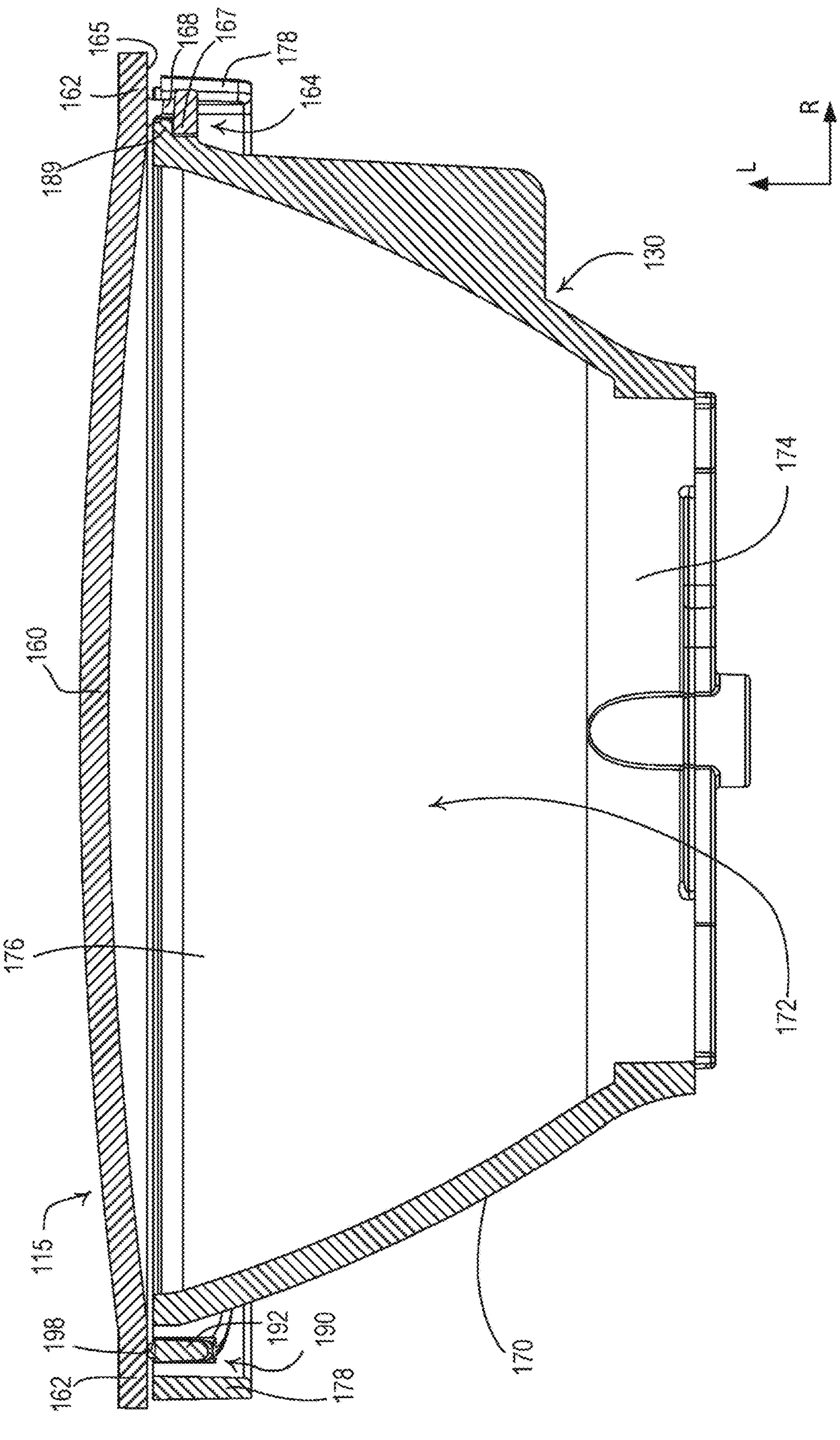
FIG. 7 is a side cross-section view of the lens and the reflector of FIG. 5.

FIG. 5 is a top perspective view of the lens 115 detached from the reflector 130. FIG. 6 is a bottom perspective view of the lens 115. FIG. 7 is a side cross-section view of the lens 115 and the reflector 130 with the lens 115 attached to the reflector 130. The lens 115 may comprise a dome portion 160 that may have a circular periphery and a convex shape. Although illustrated as having a convex shape, in some examples the dome portion 160 may be substantially planar. The lens 115 may also comprise a rim portion 162 surrounding the dome portion 160. The rim portion 162 may be substantially planar and may have a circular periphery. The lens 115 may comprise teeth 164 that extend from a rear surface 165 of the rim portion 162. The teeth 164 may allow for attachment of the lens 115 to the reflector 130 (e.g., as will be described in greater detail below). Each of the teeth 164 may comprise a body portion 166 (e.g. bridge) connected to the rear surface 165 of the rim portion 162 via two legs 168. In some examples, each of the teeth 164 is substantially arc-shaped. For example, each of the teeth 164 may be shaped to correspond with the circumference of the collar 178. The legs 168 may be configured so that there is a cavity 163 (e.g., void) between the body portion 166 and the rear surface 165 of the rim portion 162. The body portion 166 of each of the teeth 164 may comprise a ledge portion 167 that extends in a radial direction R from an interior surface of the body portion 166 toward a center of the rim portion 162.

The reflector 130 may comprise a body portion 170 that may have a truncated conical shape and may form a cavity 172 (e.g., an optical cavity of the lighting device 100) that extends from a narrow end 174 to a wide end 176 of the body portion 170. The narrow end 174 may be referred to as a first end of the reflector 130. The wide end 176 may be referred to as a second end of the reflector 130. The emitter PCB 120 may be received within the cavity 172. For example, the emitter PCB 120 may be received in the narrow end 174 of the body portion 170 of the reflector 130. The reflector 130 may further comprise a collar 178 that extends around the reflector at the wide end 176 (e.g., an outer perimeter of the wide end 176) of the body portion 170 of the reflector 130. The collar 178 may define an outer surface 179 that defines the outer perimeter of the wide end 176.

Figure 8A:
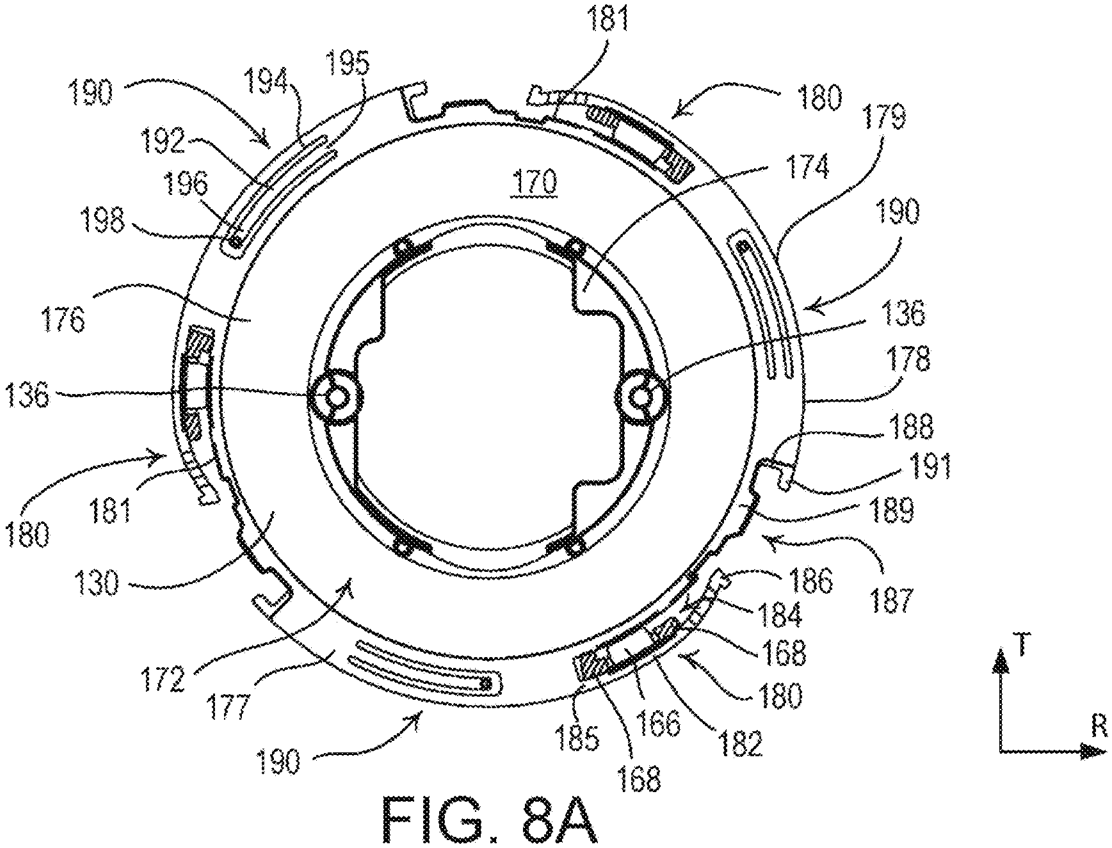
FIGS. 8A and 8B are top cross-sectional views illustrating a process for attaching the lens to the reflector of FIG. 5.
Figure 8B:
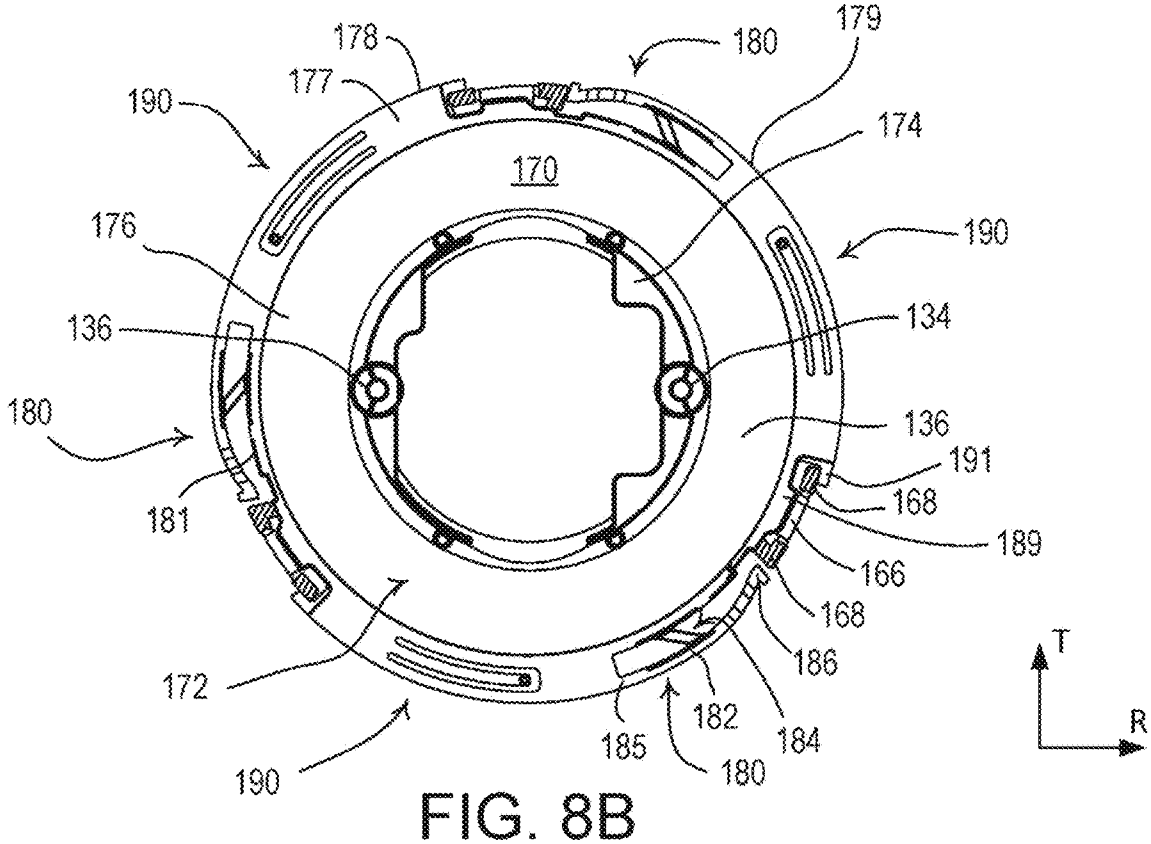

The lens 115 may be configured to be attached to the wide end 176 of the reflector 130. The collar 178 may comprise one or more (e.g., a plurality of) attachment clips 180 configured to receive the teeth 164 of the lens 115 and attach the lens 115 to the reflector 130. The attachment clips 180 may extend from the collar in a substantially circumferential direction. The circumferential direction may be defined by the outer surface 179 of the collar 178. The attachment clips 180 may be configured to engage the teeth 164, for example, such that the lens 115 is secured to the reflector 130. FIGS. 8A and 8B are top cross-sectional views (e.g., taken through the legs 168 of the teeth 164) illustrating a process for attaching the lens 115 to the reflector 130. FIG. 8A shows the lens 115 and the reflector 130 in a first assembly state and FIG. 8B shows the lens 115 and the reflector 130 in a second assembly state (e.g., a final assembly state and/or an attached state). Each of the attachment clips 180 may comprise a clip arm 182. Each clip arm 182 may form a respective slot 184 in the collar 178 and is connected to the collar 178 at a first end 185. For example, each clip arm 182 may define the respective slot 184 between the respective clip arm 182 and the collar 178 (e.g., an inner surface 181) of the collar 178. Each respective slot 184 may be configured to receive one of the teeth 164. Each clip arm 182 may be cantilevered from the collar 178 (e.g., a perimeter of the collar 178). The perimeter of the collar 178 may be defined by an outer surface 179. For example, a second end 186 of each clip arm 182 (e.g., opposite the first end 185) may not be connected to the collar 178 such that the clip arm 182 may flex about the first end 185. Each clip arm 182 may extend from the collar 178 in a substantially circumferential direction that is defined by the outer surface 179 of the collar 178. Each clip arm 182 (e.g., the second end 186) may biased inward toward the inner surface 181 of the collar 178. The collar 178 may define recesses 187 that are each located between the second end 186 of each clip arm 182 and a radial surface 188 of the respective recess 187. The collar 178 may comprise fingers 191 that extend proximate to the outer surface 179 in the circumferential direction. Each of the fingers 191 may be located proximate to a respective one of the recesses 187. The collar 178 may also comprise lip portions 189 that extend into the respective recesses 187. For example, the recesses 187 and clip arms 182 may be equally spaced about the collar 178 (e.g., the outer surface 179).

During a first step of the attachment process of the lens 115 to the reflector 130, the teeth 164 may be inserted into the slots 184 of the collar 178 (e.g., in the first assembly state as shown in FIG. 8A). During a second step of the attachment process, the lens 115 may be rotated (e.g., in a counter-clockwise direction as shown in FIG. 8B) causing the clip arms 182 to flex out from the collar 178 and allowing the teeth 164 to move into the respective recesses 187 of the collar 178. For example, each of the teeth 164 may abut (e.g., and apply a force to) a respective clip arm 182 as the lens 115 is rotated. The force applied by the teeth 164 to the clip arms 182 may be configured to push the second end 186 of the clip arms 182 away from the inner surface 181 of the collar 178. The teeth 164 may remain in contact with the respective clip arms 182 as the lens 115 is rotated until one of the legs 168 is within a respective one of the recesses 187 (e.g., and engaged with a respective finger 191 proximate to the respective one of the recesses 187). For example, the lens may be rotated until the teeth 164 move into respective recesses 187 of the collar 178. The teeth 164 may be held in place in the respective recesses 187 (e.g., in the second assembly state as shown in FIG. 8B). For example, the teeth 164 may be locked in place in an angular direction by the second ends 186 of the clip arms 182 and the radial surfaces 188 of the respective recesses 187. For example, the second ends 186 of the clip arms 182 may prevent angular movement of the lens 115 when the teeth 164 are located in the recesses 187. The fingers 191 may lock the teeth 164 within the recesses 187. For example, the fingers 191 may prevent radial movement of the teeth 164 at the radial surface 188 of the respective one of the recesses 187. In addition, the ledge portions 167 of the teeth 164 may contact the lip portions 189 of the collar 178 to retain the lens 115 in attachment to the reflector 130 (e.g., to prevent the lens 115 from being detached from the reflector 130). Accordingly, the clip arms 182 may be configured to prevent or limit movement (e.g., angular movement) of the lens 115 once it is attached to the reflector 130. In some examples, the ledge portions 167 may be configured to contact a lower surface 171 of the lip portion 189 to limit movement (e.g., in the radial direction R, transverse direction T, and/or longitudinal direction L) of the lip portion 189 within a cavity 163 (e.g., void) defined between the body portion 166 and the rear surface 165 of the rim portion 162.

The reflector 130 may comprise biasing members 190 in the collar 178. The biasing members 190 may comprise spring arms 192 formed in respective openings 194 in the collar 178. The spring arms 192 may each be connected to the collar 178 at a first end 195 and extend to a second end 196 that is not connected to the collar 178. For example, the second end 196 of the spring arms 192 may be cantilevered from the collar 178. The biasing members 190 may each comprise a boss 198 at the second end 196 of the respective spring arm 192. The boss 198 may be a rounded knob that extends beyond a plane defined by an upper surface 177 of the collar 178. The biasing members 190 may be configured to pivot about the first end 195. When the lens 115 is installed on the reflector 130 (e.g., as shown in FIG. 7), the boss 198 at the second end 196 of each spring arm 192 may each be configured to apply a force against the lens 115 (e.g., the rim portion 162). For example, each of the spring arms 192 may apply the force onto the lens 115 when the lens 115 is attached to the reflector 130. The force may be applied by the boss 198 in the longitudinal direction L as shown in FIG. 7 such that the rim portion 162 is pushed away from the collar 178. The force applied by the boss 198 may cause the ledge portions 167 of the teeth 164 of the lens 115 to come in contact with the respective lip portions 189 of the collar 178 of the reflector 130. The application of force by the spring arms 192 against the lens 115 to bias the ledge portions 167 (e.g., in the longitudinal direction L) against the lip portions 189 may prevent the lens 115 from rattling against the reflector 130 and making noise when the lens 115 is attached to the reflector 130.

What is claimed is:

1. A lighting device comprising:

a lens comprising a rim portion having teeth extending in a longitudinal direction from a rear surface of the rim portion, wherein each of the teeth comprises a ledge portion and a body portion that is connected to the rear surface of the rim portion via two legs;

an emitter configured to emit light through the lens; and a reflector defining a first cavity that extends from a first end of the reflector to a second end of the reflector, the emitter received within the first cavity at the first end and the lens configured to be attached to the second end of the reflector, the reflector comprising:

a collar that extends around the second end of the reflector, the collar comprising an outer surface that defines an outer perimeter of the second end;

a plurality of attachment clips extending from the collar in a substantially circumferential direction, each of the plurality of attachment clips configured to engage a respective one of the teeth such that the lens is secured to the reflector; and a spring arm configured to apply a first force to on the lens when the lens is attached to the reflector such that the rim portion is pushed away from the collar, and wherein the ledge portion of each of the teeth is configured to contact a lower surface of respective lip portions of the collar to limit movement of the lip portions within a respective second cavity that is located between the body portion and the rear surface of the rim portion.

2. The lighting device of claim 1, wherein each of the plurality of attachment clips comprises a clip arm that is cantilevered from the collar in a substantially circumferential direction.

3. The lighting device of claim 1, wherein each of the plurality of attachment clips comprises a clip arm, a first end of the clip arm attached to the collar and a second end of the clip arm cantilevered from the collar, the clip arm of each of the plurality of attachment clips defining a slot between the respective clip arm and the collar, each clip arm configured to flex about a first end of the collar.

4. The lighting device of claim 3, wherein the slot defined by the clip arm of each of the plurality of attachment clips is defined between the respective clip arm and an inner surface of the collar, and wherein each respective slot is configured to receive one of the teeth.

5. The lighting device of claim 4, wherein each of the teeth is configured to abut a respective clip arm as the lens is rotated.

6. The lighting device of claim 5, wherein the teeth are configured to apply a second force to the respective clip arm as the lens is rotated, the second force configured to push the second end of the respective clip arm away from the inner surface of the collar.

7. The lighting device of claim 6, wherein the lens is configured to be rotated until the teeth move into respective recesses defined by radial surfaces of the collar, wherein each of the teeth are configured to abut a respective radial surface when the teeth are in the respective recesses.

8. The lighting device of claim 7, wherein the second end of each clip arm is configured to abut a respective one of the teeth to prevent angular movement of the lens when the teeth are located in the respective recesses.

9. The lighting device of claim 8, wherein the ledge portion of each of the teeth is configured to contact a respective lip portion of the collar of the reflector to retain the lens in attachment to the reflector when the teeth are located in the recesses.

10. The lighting device of claim 9, wherein the reflector further comprises a plurality of spring arms configured to apply the first force onto the lens to cause the ledge portion of the teeth to contact the respective lip portions of the collar of the reflector when the lens is attached to the reflector.

11. The lighting device of claim 10, wherein the ledge portion of the teeth extend in a radial direction from an interior surface of the body portion toward a center of the rim portion.

12. The lighting device of claim 3, wherein the collar comprises recesses between the second ends of each clip arm and respective radial surfaces of the collar, the teeth configured to be received in the recesses of the collar when the lens is attached to the reflector.

13. The lighting device of claim 12, wherein, to attach the lens to the reflector, the teeth are inserted into the slots of the attachment clips and the lens is rotated such the teeth are moved into the recesses of the collar.

14. The lighting device of claim 1, wherein the teeth are arc-shaped to correspond with a circumference of the collar.

15. The lighting device of claim 1, wherein the spring arm comprises a boss at the second end of the spring arm, and wherein the boss is configured to apply the first force to the rim portion of the lens when the lens is attached to the reflector such that the rim portion is pushed away from the collar.

16. The lighting device of claim 15, wherein when the lens is attached to the reflector, the first force causes the ledge portions of the teeth to come in contact with respective lip portions of the collar.

* * * * *